US008532110B2

(12) United States Patent
McCann et al.

(10) Patent No.: US 8,532,110 B2
(45) Date of Patent: Sep. 10, 2013

(54) METHODS, SYSTEMS, AND COMPUTER READABLE MEDIA FOR DIAMETER PROTOCOL HARMONIZATION

(75) Inventors: Thomas M. McCann, Raleigh, NC (US); Petrus Wilhelmus Adrianus Jacobus Maria Nas, Gravenhage (The Hague) (NL); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 155 days.

(21) Appl. No.: 13/026,144

(22) Filed: Feb. 11, 2011

(65) Prior Publication Data

US 2011/0200047 A1    Aug. 18, 2011

Related U.S. Application Data

(60) Provisional application No. 61/304,310, filed on Feb. 12, 2010.

(51) Int. Cl.
*H04L 12/56* (2011.01)

(52) U.S. Cl.
USPC ........... 370/392; 370/389; 370/230; 370/401; 707/999.101; 726/3

(58) Field of Classification Search
USPC .. 370/389, 401, 466, 230, 392; 707/999.101; 726/3
See application file for complete search history.

(56) References Cited

U.S. PATENT DOCUMENTS

| | | | |
|---|---|---|---|
| 5,719,861 | A  | 2/1998  | Okanoue |
| 6,157,621 | A  | 12/2000 | Brown et al. |
| 6,273,622 | B1 | 8/2001  | Ben-David |
| 6,304,273 | B1 | 10/2001 | Bonnet |
| 6,584,073 | B1 | 6/2003  | Steele, Jr. et al. |
| 6,795,546 | B2 | 9/2004  | Delaney et al. |
| 6,819,652 | B1 | 11/2004 | Akhtar et al. |
| 6,865,153 | B1 | 3/2005  | Hill et al. |

(Continued)

FOREIGN PATENT DOCUMENTS

| | | |
|---|---|---|
| CA | 2 716 544 A1 | 12/2010 |
| EP | 1 134 939 A1 | 9/2001 |

(Continued)

OTHER PUBLICATIONS

Notification of Transmittal of the International Search Report and the Written Opinion of the International Searching Authority, or the Declaration for International Application No. PCT/US2010/053062 (Jun. 28, 2011).

(Continued)

*Primary Examiner* — Andrew Chriss
*Assistant Examiner* — Mohamed Kamara
(74) *Attorney, Agent, or Firm* — Jenkins, Wilson, Taylor & Hunt, P.A.

(57) ABSTRACT

According to one aspect, the subject matter described herein includes a method for providing Diameter protocol harmonization. The method includes steps occurring at a Diameter node. The method further includes determining a first Diameter protocol associated with received Diameter information that is to be sent to a destination. The method also includes determining a second Diameter protocol associated with the destination. The method further includes harmonizing the received Diameter information such that the harmonized Diameter information is compatible with the second Diameter protocol. The method also includes providing the harmonized Diameter information to the destination.

17 Claims, 6 Drawing Sheets

(56) References Cited

U.S. PATENT DOCUMENTS

| | | | |
|---|---|---|---|
| 6,915,345 B1 | 7/2005 | Tummala et al. | |
| 6,918,041 B1 | 7/2005 | Chen | |
| 6,954,790 B2 | 10/2005 | Forslöw | |
| 6,967,956 B1 | 11/2005 | Tinsley et al. | |
| 7,042,877 B2* | 5/2006 | Foster et al. | 370/389 |
| 7,043,000 B2 | 5/2006 | Delaney et al. | |
| 7,079,499 B1 | 7/2006 | Akhtar et al. | |
| 7,136,635 B1 | 11/2006 | Bharatia et al. | |
| 7,257,636 B2 | 8/2007 | Lee et al. | |
| 7,286,516 B2 | 10/2007 | Delaney et al. | |
| 7,292,592 B2 | 11/2007 | Rune | |
| 7,298,725 B2 | 11/2007 | Rune | |
| 7,333,438 B1 | 2/2008 | Rabie et al. | |
| 7,333,482 B2 | 2/2008 | Johansson et al. | |
| 7,383,298 B2 | 6/2008 | Palmer et al. | |
| 7,403,492 B2 | 7/2008 | Zeng et al. | |
| 7,403,537 B2 | 7/2008 | Allison et al. | |
| 7,466,807 B2 | 12/2008 | McCann et al. | |
| 7,551,926 B2 | 6/2009 | Rune | |
| 7,567,796 B2 | 7/2009 | Tammi et al. | |
| 7,583,963 B2 | 9/2009 | Tammi et al. | |
| 7,590,732 B2 | 9/2009 | Rune | |
| 7,633,872 B2 | 12/2009 | Pitcher et al. | |
| 7,633,969 B2 | 12/2009 | Caugherty et al. | |
| 7,706,343 B2 | 4/2010 | Delaney et al. | |
| 7,792,981 B2* | 9/2010 | Taylor | 709/230 |
| 7,822,023 B2 | 10/2010 | Lahetkangas et al. | |
| 7,894,353 B2 | 2/2011 | Li et al. | |
| 7,898,957 B2 | 3/2011 | Lea et al. | |
| 7,916,685 B2 | 3/2011 | Schaedler et al. | |
| 7,961,685 B2 | 6/2011 | Suh et al. | |
| 7,996,007 B2 | 8/2011 | Bantukul | |
| 7,996,541 B2 | 8/2011 | Marathe et al. | |
| 8,041,021 B2 | 10/2011 | Xu et al. | |
| 8,045,983 B2 | 10/2011 | Bantukul | |
| 8,170,035 B2* | 5/2012 | Furey et al. | 370/401 |
| 8,170,055 B2 | 5/2012 | Fang et al. | |
| 8,478,828 B2 | 7/2013 | Craig et al. | |
| 8,483,233 B2 | 7/2013 | Craig et al. | |
| 2001/0024443 A1 | 9/2001 | Alriksson et al. | |
| 2002/0049901 A1 | 4/2002 | Carvey | |
| 2002/0051427 A1 | 5/2002 | Carvey | |
| 2002/0087723 A1 | 7/2002 | Williams et al. | |
| 2002/0133494 A1 | 9/2002 | Goedken | |
| 2002/0133534 A1 | 9/2002 | Forslow | |
| 2002/0141346 A1 | 10/2002 | Garcia-Luna-Aceves et al. | |
| 2002/0181507 A1 | 12/2002 | Jones | |
| 2003/0095536 A1 | 5/2003 | Hu et al. | |
| 2003/0115358 A1 | 6/2003 | Yun | |
| 2004/0037278 A1 | 2/2004 | Wong et al. | |
| 2004/0042485 A1 | 3/2004 | Gettala et al. | |
| 2004/0098612 A1 | 5/2004 | Lee et al. | |
| 2005/0002417 A1* | 1/2005 | Kelly et al. | 370/466 |
| 2005/0099964 A1 | 5/2005 | Delaney et al. | |
| 2005/0232236 A1 | 10/2005 | Allison et al. | |
| 2005/0232407 A1 | 10/2005 | Craig et al. | |
| 2005/0235065 A1 | 10/2005 | Le et al. | |
| 2005/0246545 A1 | 11/2005 | Reiner | |
| 2005/0246716 A1 | 11/2005 | Smith et al. | |
| 2006/0045249 A1 | 3/2006 | Li et al. | |
| 2006/0077926 A1 | 4/2006 | Rune | |
| 2006/0101159 A1 | 5/2006 | Yeh et al. | |
| 2006/0104210 A1 | 5/2006 | Nielsen | |
| 2006/0123477 A1 | 6/2006 | Raghavan et al. | |
| 2006/0172730 A1 | 8/2006 | Matsuda | |
| 2006/0177007 A1 | 8/2006 | Vaghar et al. | |
| 2006/0200670 A1 | 9/2006 | Kuffel et al. | |
| 2006/0221972 A1 | 10/2006 | Bhargava et al. | |
| 2006/0253563 A1 | 11/2006 | Yang et al. | |
| 2006/0274744 A1 | 12/2006 | Nagai et al. | |
| 2007/0047539 A1 | 3/2007 | Agarwal et al. | |
| 2007/0153995 A1 | 7/2007 | Fang et al. | |
| 2007/0168421 A1 | 7/2007 | Kalyanpur et al. | |
| 2007/0214209 A1 | 9/2007 | Maeda | |
| 2007/0280447 A1 | 12/2007 | Cai et al. | |
| 2007/0297419 A1 | 12/2007 | Askerup et al. | |
| 2008/0025230 A1 | 1/2008 | Patel et al. | |
| 2008/0039104 A1 | 2/2008 | Gu et al. | |
| 2008/0043614 A1 | 2/2008 | Soliman | |
| 2008/0144602 A1 | 6/2008 | Casey | |
| 2008/0167035 A1 | 7/2008 | Buckley et al. | |
| 2008/0212576 A1 | 9/2008 | O'Neill | |
| 2008/0301162 A1* | 12/2008 | Wall et al. | 707/101 |
| 2008/0317247 A1 | 12/2008 | Jeong et al. | |
| 2009/0080440 A1 | 3/2009 | Balyan et al. | |
| 2009/0083861 A1 | 3/2009 | Jones | |
| 2009/0129271 A1 | 5/2009 | Ramankutty et al. | |
| 2009/0138619 A1 | 5/2009 | Schnizlein et al. | |
| 2009/0185494 A1 | 7/2009 | Li et al. | |
| 2009/0193071 A1 | 7/2009 | Qiu et al. | |
| 2009/0232011 A1 | 9/2009 | Li et al. | |
| 2010/0017846 A1 | 1/2010 | Huang et al. | |
| 2010/0042525 A1 | 2/2010 | Cai et al. | |
| 2010/0135287 A1 | 6/2010 | Hosain et al. | |
| 2010/0251330 A1* | 9/2010 | Kroeselberg et al. | 726/3 |
| 2010/0265948 A1 | 10/2010 | Patel et al. | |
| 2010/0299451 A1 | 11/2010 | Yigang et al. | |
| 2011/0060830 A1 | 3/2011 | Kang et al. | |
| 2011/0116378 A1 | 5/2011 | Ramankutty et al. | |
| 2011/0116382 A1 | 5/2011 | McCann et al. | |
| 2011/0188397 A1 | 8/2011 | McCann et al. | |
| 2011/0199895 A1 | 8/2011 | Kanode et al. | |
| 2011/0199906 A1 | 8/2011 | Kanode et al. | |
| 2011/0200053 A1 | 8/2011 | Kanode et al. | |
| 2011/0200054 A1 | 8/2011 | Craig et al. | |
| 2011/0202604 A1 | 8/2011 | Craig et al. | |
| 2011/0202612 A1 | 8/2011 | Craig et al. | |
| 2011/0202613 A1 | 8/2011 | Craig et al. | |
| 2011/0202614 A1 | 8/2011 | Craig et al. | |
| 2011/0202676 A1 | 8/2011 | Craig et al. | |
| 2011/0202677 A1 | 8/2011 | Craig et al. | |
| 2011/0202684 A1 | 8/2011 | Craig et al. | |
| 2011/0225280 A1 | 9/2011 | Delsesto et al. | |
| 2011/0225306 A1 | 9/2011 | Delsesto et al. | |
| 2011/0302244 A1 | 12/2011 | McCann et al. | |
| 2011/0314178 A1 | 12/2011 | Kanode et al. | |
| 2012/0155389 A1 | 6/2012 | McNamee et al. | |
| 2012/0224524 A1 | 9/2012 | Marsico | |

FOREIGN PATENT DOCUMENTS

| | | |
|---|---|---|
| EP | 1 328 102 A1 | 7/2003 |
| EP | 1 465 385 A1 | 10/2004 |
| EP | 1 314 324 B1 | 8/2008 |
| EP | 1 847 076 B1 | 2/2012 |
| WO | WO 2009/058067 A1 | 5/2007 |
| WO | WO 2008/087633 A2 | 7/2008 |
| WO | WO 2009/070179 A1 | 6/2009 |
| WO | WO 2009/134265 A1 * | 11/2009 |
| WO | WO 2011/047382 A2 | 4/2011 |
| WO | WO 2011/100587 A2 | 8/2011 |
| WO | WO 2011/100594 A2 | 8/2011 |
| WO | WO 2011/100600 A2 | 8/2011 |
| WO | WO 2011/100603 A2 | 8/2011 |
| WO | WO 2011/100606 A2 | 8/2011 |
| WO | WO 2011/100609 A2 | 8/2011 |
| WO | WO 2011/100610 A2 | 8/2011 |
| WO | WO 2011/100612 A2 | 8/2011 |
| WO | WO 2011/100615 A2 | 8/2011 |
| WO | WO 2011/100621 A2 | 8/2011 |
| WO | WO 2011/100629 A2 | 8/2011 |
| WO | WO 2011/100630 A2 | 8/2011 |
| WO | WO 2012/119147 A1 | 9/2012 |

OTHER PUBLICATIONS

Znaty, "Diameter, GPRS, (LTE +ePC = EPS), IMS, PCC, and SDM," EFORT, pp. 1-460 (May 2010).

"Ericsson Unified Number Portability," (Downloaded from the Internet on Jan. 24, 2011).

"3rd Generation Partnership Project; Technical Specification Group Core Network and Terminals; Policy and Charging Control signalling flows and Quality of Service (QoS) parameter mapping (Release 9)," 3GPP TS 29.211 V92.0 pp. 1-129 (March 2010).

"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunication Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunication System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release9)," 3GPP TS 33.220 V9.2.0 (Dec. 2009).
3GPP, "3rd Generation Partnership Project; Technical Specification Group Service and System Aspects; Telecommunication Management; Changing Management; Diameter Charging Applications (Release 9)," 3GPP TS 32.299 V9.2.0 (Dec. 2009).
3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).
3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).
3GPP, "3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2019).
Korhonen et al., "Diameter User-Name and Realm Based Request Routing Clarifications," Internet-Draft, draft-ietf-dime-nai-routing-03.txt, pp. 1-11 (Aug. 19, 2009).
Tsou et al., "Session-Spectific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evolved Packet System (EPS); Mobility Management Entity, (MME) and Serving Gprs Support Node (SGSN) Related Interfaces Based on Diameter Protocol (Release 8)," ETSI TS 129.272 V8.3.0 (Jun. 2009).
Bhardwaj, "Roaming Hubbing & LTE," GSMA London, pp. 1-11 (May 19, 2009).
3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).
3GPP, "3rd Generation Partnership Project; Technical Specification Group Service and System Aspects; Telecommunication Management; Charging Management; Charging Data Description for the IP Multimedia Subsystem (IMS) (Release 5)," GPP TS 32.225 V5.11.0 (Mar. 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005).
Calhoun et al., "Diameter Mobile IPv4 Application," Network Working Group, RFC 4004, pp. 1-50 (Aug. 2005).
3GPP, "3rd Generation Partnership Project; Technical Specification Group Core Network; Support of Mobile.Number Portability (MNP); Technical Realization; Stage 2 (Release 6)," 3GPP TS 23.066, V6.0.0, pp. 1-83.(Dec. 2004).
Calhoun et al., "Diameter Base Protocol," Network Working Group, RFC 3588, pp. 1-148 (Sep. 2003).

Aboba et al., "Authentication, Authorization and Accounting (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).
"Diameter Overview," referenced from www.ulticom.com/html/products/signalware-diameter-reference-guide.asp (Publication Date Unknown).
Advisory Action for U.S. Appl. No. 12/906,816 (Jun. 5, 2012).
Non-Final Official Action for U.S. Appl. No. 13/026,076 (Jun. 4, 2012).
Applicant-Initiated Interview Summary for U.S. Appl. No. 12/906,816 (May 17, 2012).
Non-Final Official Action for U.S. Appl. No. 13/026,105 (May 16, 2012).
Final Official Action for U.S. Appl. No. 12/906,816 (Feb. 21, 2012).
Applicant-Initiated Interview Summary for U.S. Appl. No. 12/906,816 (Jan. 27, 2012).
Notification of Transmittal of the International Search Report and the Written Opinion of the International Searching Authority, or the Declaration for International Application No. PCT/US2011/024622 (Oct. 31, 2011).
Notification of Transmittal of the International Search Report and the Written Opinion of the International Searching Authority, or the Declaration for International Application No. PCT/US2011/024617 (Oct. 31, 2011).
Notification of Transmittal of the International Search Report and the Written Opinion of the International Searching Authority, or the Declaration for International Application No. PCT/US2011/024614 (Oct. 31, 2011).
Notification of Transmittal of the International Searching Authority, or the Declaration for Search Report and the Written Opinion of the International International Application No. PCT/US2011/024646 (Oct. 28, 2011).
Notification of Transmittal of the International Searching Authority, or the Declaration for Search Report and the Written Opinion of the International International Application No. PCT/US2011/024645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/US2011/024621 (Oct. 28, 2011).
Notification of Transmittal of the International Search Report and the Written Opinion of the International Searching Authority, or the Declaration for International Application No. PCT/US2011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Non-Final Official Action for U.S. Appl. No. 12/906,816 (Oct. 5, 2011).
Jones et al., "Diameter Command Code Registration for the Third Generation Partnership Project (3GPP) Evolved Packet System (EPS)," Network Working Group, RFC 5516, pp. 1-5 (Apr. 2009).
Supplemental Notice of Allowability for U.S. Appl. No. 13/026,162 (Feb. 7, 2013).
Notice of Allowance and Fee(s) Due for U.S. Appl. No. 13/026,031 (Jan. 30, 2013).
Supplemental Notice of Allowability for U.S. Appl. No. 13/026,162 (Jan. 24, 2013).
Notice of Allowance and Fee(s) Due for U.S. Appl. No. 13/026,162 (Dec. 19, 2012).
Final Official Action for U.S. Appl. No. 13/026,076 (Dec. 7, 2012).
Final Official Action for U.S. Appl. No. 13/026,105 (Nov. 26, 2012).
Communication of European Publication Number and Information on the Application of Article 37(3) EPC for European Patent Application No. 11742923.3 (Nov. 21, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Non-Final Official Action for U.S. Appl. No. 13/026,153 (Nov. 6, 2012).
Non-Final Official Action for U.S. Appl. No. 13/412,352 (Oct. 26, 2012).
Non-Final Official Action for U.S. Appl. No. 13/026,098 (Sep. 20, 2012).
Non-Final Official Action for U.S. Appl. No. 13/026,060 (Sep. 19, 2012).
Communication of European Publication Number and Information on the Application of Article 67(3) EPC for European Patent Application No. 11742921.7 (Sep. 12, 2012).
Non-Final Official Action for U.S. Appl. No. 13/026,081 (Sep. 12, 2012).
Non-Final Official Action for U.S. Appl. No. 13/026,112 (Aug. 29, 2012).
Communication of European publication number and information on the application of Article 67(3) EPC for European Application No. 10824243.9 (Jul. 25, 2012).
Notification of Transmittal of the International Search Report and the Written Opinion of the International Searching Authority, or the Declaration for International Patent Application No. PCT/US2012/027736 (Jun. 12, 2012).
Traffix Systems, "Datasheet; Traffix Signaling Delivery Controller (SDC)," pp. 1-5 (May 2011).
Notice of Allowance and Fee(s) Due for U.S. Appl. No. 13/026,112 (Apr. 26, 2013).
Notice of Allowance and Fee(s) Due for U.S. Appl. No. 13/026,153 (Apr. 15, 2013).
Notice of Allowance and Fee(s) Due for U.S. Appl. No. 13/026,162 (Apr. 1, 2013).
Supplemental Notice of Allowability for U.S. Appl. No. 13/026,031 (Mar. 22, 2013).
Notice of Allowance and Fee(s) Due for U.S. Appl. No. 13/026,098 (Mar. 11, 2013).
Supplemental Notice of Allowability for U.S. Appl. No. 13/026,162 (Feb. 27, 2013).

Notice of Allowance and Fee(s) Due for U.S. Appl. No. 13/025,968 (Feb. 27, 2013).
Commony-Assigned, Co-Pending U.S. Appl. No. 13/932,608 titled "Methods, Systems, and Computer Readable Media for Inter-Diamater-Message Processor Routing," (unpublished, filed Jul. 1, 2013).
Notice of Allowance and Fee(s) Due for for U.S. Appl. No. 13/026,076 (Jun. 27, 2013).
Restriction Requirement for U.S. Appl. No. 13/026,125 (Jun. 11, 2013).
Notice of Allowance and Fee(s) Due for U.S. Appl. No. 13/026,081 (Jun. 5, 2013).
Notice of Allowance and Fee(s) Due for U.S. Appl. No. 13/026,031 (May 30, 2013).
Notice of Allowance and Fee(s) Due for U.S. Appl. No. 13/412,352 (May 28, 2013).
Interview Summary for U.S. Appl. No. 13/026,098 (May 23, 2013).
Final Office Action for U.S. Appl. No. 13/026,060 (May 10, 2013).

* cited by examiner

| DIAMETER Host ID | Application ID | DIAMETER Protocol ID |
|---|---|---|
| www.tklc.com | 88 | 1 |
| www.vzw.com | 88 | 2 |
| www.vzw.com | 15 | 3 |

FIG. 2

| Ingress DIAMETER Protocol ID | Egress DIAMETER Protocol ID | Harmonization Rule Set ID |
|---|---|---|
| 1 | 2 | 1 |
| 2 | 1 | 2 |
| 1 | 3 | 3 |

| Harmonization Rule Set ID | Harmonization Rule |
|---|---|
| 1 | ADD AVP: "Server Capacity" AVP: Default value = 300 |
| 1 | MODIFY AVP: Format AVP Containing IMSI value: ITU E.212 |
| 1 | DELETE AVP: Delete "ATT_Host" AVP |

400

FIG. 4

METHODS, SYSTEMS, AND COMPUTER READABLE MEDIA FOR DIAMETER PROTOCOL HARMONIZATION

PRIORITY CLAIM

This application claims the benefit of U.S. Provisional Patent Application Ser. No. 61/304,310 filed Feb. 12, 2010; the disclosure of which is incorporated herein by reference in its entirety.

STATEMENT OF INCORPORATION BY REFERENCE

The disclosures of each of the following commonly-owned, co-pending U.S. Patent Applications filed on Feb. 11, 2011 are hereby incorporated herein by reference in their entireties:

"Methods, Systems, And Computer Readable Media for Inter-Diameter-Message Processor Routing," (Ser. No. 13/025,968);

"Methods, Systems, And Computer Readable Media For Source Peer Capacity-Based Diameter Load Sharing" (Ser. No. 13/026,031);

"Methods, Systems, And Computer Readable Media For Inter-Message Processor Status Sharing," (Ser. No. 13/026,105);

"Methods, Systems, And Computer Readable Media For Providing Priority Routing At A Diameter Node," (Ser. No. 13/026,060);

"Methods, Systems, And Computer Readable Media For Providing Peer Routing At A Diameter Node," (Ser. No. 13/026,076);

"Methods, Systems, And Computer Readable Media For Providing Origin Routing At A Diameter Node," (Ser. No. 13/026,081);

"Methods, Systems, And Computer Readable Media For Providing Local Application Routing At A Diameter Node," (Ser. No. 13/026,098);

"Methods, Systems, And Computer Readable Media For Answer-Based Routing Of Diameter Request Messages," (Ser. No. 13/026,112);

"Methods, Systems, And Computer Readable Media For Performing Diameter Answer Message-Based Network Management At A Diameter Signaling Router (DSR)," (Ser. No. 13/026,125);

"Methods, Systems, And Computer Readable Media For Multi-Interface Monitoring And Correlation Of Diameter Signaling Information," (Ser. No. 13/026,133);

"Methods, Systems, And Computer Readable Media For Diameter Network Management," (Ser. No. 13/026,153); and "Methods, Systems, And Computer Readable Media For Diameter Application Loop Prevention," (Ser. No. 13/026,162).

TECHNICAL FIELD

The subject matter described herein relates to methods, systems, and computer readable media for communications in a communications network. More particularly, the subject matter described herein relates to methods, systems, and computer readable media for Diameter protocol harmonization.

BACKGROUND

Diameter is an authentication, authorization and accounting (AAA) protocol for computer networks, and is a successor to Radius. The Diameter base protocol is defined in International Engineering Task Force (IETF) request for comments (RFC) 3588 which is incorporated by reference herein in its entirety. Extensions to the base protocol also exist, with some extensions having defined standards. For example, RFC 4072 defines Diameter Extensible Authentication Protocol (EAP) Application.

While a standard may generally describe scope and other characteristics of a Diameter protocol, the standard may also allow for various implementation choices. For example, vendor 'A' may implement or use a Diameter protocol that creates Diameter messages that are different (e.g., partially or fully incompatible) from Diameter messages created using a second vendor's implementation. Diameter protocol incompatibility can cause various problems. For example, Diameter nodes that use incompatible Diameter protocols may be unable to effectively communicate.

Accordingly, there exists a need for methods, systems, and computer readable media for Diameter protocol harmonization.

SUMMARY

According to one aspect, the subject matter described herein includes a method for providing Diameter protocol harmonization. The method includes steps occurring at a Diameter node. The method further includes determining a first Diameter protocol associated with received Diameter information that is to be sent to a destination. The method also includes determining a second Diameter protocol associated with the destination. The method further includes harmonizing the received Diameter information such that the harmonized Diameter information is compatible with the second Diameter protocol. The method also includes providing the harmonized Diameter information to the destination.

According to another aspect, the subject matter described herein includes a system for providing Diameter protocol harmonization. The system includes a Diameter node. The Diameter node includes a communications interface for receiving Diameter information that is to be sent to a destination. The Diameter node also includes a harmonization module for determining a first Diameter protocol associated with the received Diameter information, for determining a second Diameter protocol associated with the destination, for harmonizing the received Diameter information such that the harmonized Diameter information is compatible with the second Diameter protocol, and for providing the harmonized Diameter information to the destination.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

As used herein, the term "Diameter protocol" may refer to any Diameter protocol framework or implementation thereof. For example, a Diameter protocol may be a Diameter protocol implementation, a Diameter protocol version, a variant of a Diameter protocol version, a Diameter protocol variant, or a version of a Diameter protocol variant.

BRIEF DESCRIPTION OF THE DRAWINGS

Preferred embodiments of the subject matter described herein will now be explained with reference to the accompanying drawings, wherein like reference numerals represent like parts, of which:

FIG. 2 is a diagram illustrating exemplary information for determining a Diameter protocol according to an embodiment of the subject matter described herein;

FIG. 3 is a diagram illustrating exemplary information for determining a harmonization rule set to be applied according to an embodiment of the subject matter described herein;

FIG. 4 is a diagram illustrating exemplary information for determining rules associated with a harmonization rule set to be applied according to an embodiment of the subject matter described herein;

DETAILED DESCRIPTION

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
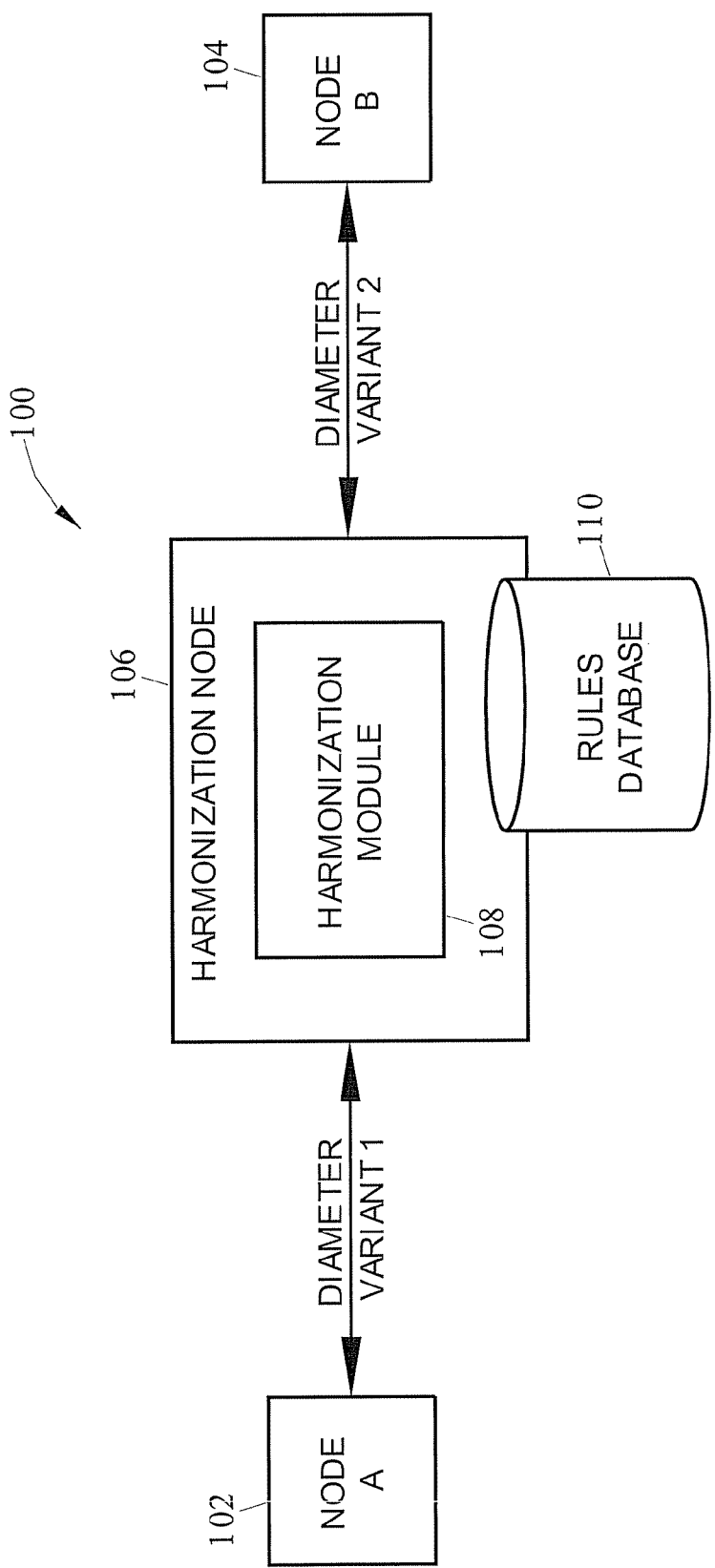
FIG. 1 is a network diagram illustrating an exemplary network including a Diameter node having a harmonization module according to an embodiment of the subject matter described herein.

FIG. 1 is a network diagram illustrating an exemplary communications network 100 according to an embodiment of the subject matter described herein. In the embodiment illustrated in FIG. 1, communications network 100 may include a Diameter harmonization node 106 having a harmonization module 108 and having access to a rules database 110. Communications network 100 may also include additional Diameter nodes, such as Node A 102 and Node B 104.

Diameter nodes (e.g., Node A 102, and Node B 104, and harmonization node 106) may be nodes capable of implementing or using a Diameter protocol. For example, a Diameter node may comprise a mobility management entity (MME), a home subscriber server (HSS) and/or authentication, authorization, and accounting (AAA) server, a Bearer Binding and Event Reporting Function (BBERF), a policy and charging enforcement function (PCEF), a policy and charging rules function (PCRF), a subscriber profile repository (SPR), a serving gateway (SGW), a packet data network gateway (PDN GW), a Diameter peer node, a Diameter agent, a network node, a policy engine, a policy server, an application function (AF), an application server, a Diameter signaling agent, a long term evolution (LTE) node, an Internet protocol (IP) multimedia subsystem (IMS) network node, a server, a node, a database, a computing platform, or a Diameter signaling router (DSR).

In some embodiments, harmonization node 106 may comprise a DSR. A DSR may be any suitable entity for routing or relaying Diameter signaling messages between Diameter nodes. For example, a DSR may be a LTE signaling router, an LTE Diameter signaling router, a Diameter signaling agent, a Diameter proxy agent, a Diameter relay agent, a Diameter routing agent, a Diameter translation agent, or a Diameter redirect agent. A DSR may include functionality for processing various messages and may include various communications interfaces for communication with Diameter nodes, e.g., 3rd Generation Partnership Project (3GPP) LTE communications interfaces and other (e.g., non-LTE) communications interfaces. In one embodiment, DSR related functionality, including the subject matter described herein, may be included in one or more modules (e.g., a harmonization module and a routing module). Harmonization node 106 and/or harmonization module 108 may include functionality for performing Diameter protocol harmonization. Diameter protocol harmonization may include any actions for providing Diameter information in a compatible or appropriate form. For example, Diameter protocol harmonization may include receiving, modifying, generating, and/or providing Diameter information between Diameter nodes that use various Diameter protocols.

Diameter protocols may be defined, described, and/or implemented by various entities. For example, a Diameter protocol version and/or variant may be defined by a standards setting entity, such as IETF, International Telecommunication Union (ITU), European Telecommunications Standards Institute (ETSI), 3GPP, governmental agencies, and/or other organizations. In another example, a Diameter protocol version and/or variant may be defined by other entities, e.g., open source projects, product vendors, and network operators.

In one embodiment, Diameter protocol harmonization may include adding, deleting, and/or modifying one or more portions of a Diameter message. For example, Diameter protocol harmonization may include adding, deleting, and/or modifying an attribute value pair (AVP) of a Diameter message. In another example, harmonization may include adding, deleting, and/or modifying parameters and/or values contained in an AVP. In yet another example, harmonization may include adding, deleting, and/or modifying message portions, such as a header portion and a payload portion.

In one embodiment, Diameter protocol harmonization may use one or more harmonization rules for performing Diameter protocol harmonization. For example, a harmonization rule may include information for converting Diameter information from a first Diameter protocol version into a second Diameter protocol version. For instance, the harmonization rule may include information indicating portions of a Diameter message to be modified and indicating modifications to be performed on the portions.

Harmonization node 106 may include or have access to one or more databases, such as rules database 110. Rules database 110 may include any suitable data structure for storing or maintaining harmonization rules. Harmonization node 106 may include or have access to a reporting database. The reporting database may store information about messages and associated processing (e.g., call detail records (CDRs)). The stored information at reporting database may be usable for various purposes, such as accounting, billing, maintenance, and authentication.

Referring to the embodiment shown in FIG. 1, harmonization node 106, including harmonization module 108, may be an intermediate node for communications between Node A 102 and Node B 104. Node A 102 may utilize a Diameter protocol (e.g., Diameter Variant 1) that is partially or fully incompatible with a second Diameter protocol (e.g., Diameter Variant 2) utilized by Node B 104.

Harmonization node 106 may receive Diameter messages (e.g., Diameter request messages and Diameter answer messages) from Node A 102 and/or Node B 104. In one embodiment, harmonization node 106 may determine a Diameter protocol associated with a received Diameter message. For example, harmonization node 106 may have access to stored Diameter protocol information for various nodes and/or applications executing at the nodes. For instance, harmonization node 106 may access a data structure that includes information associating Diameter nodes and utilized Diameter protocols. By comparing header information of a received Diameter message with stored Diameter protocol information, harmonization node 106 may determine that a Diameter message originating from Node B 104 is associated with a particular Diameter protocol. In another example, harmonization node 106 may determine a Diameter protocol associated with a received Diameter message based on an examining the message structure, or a portion thereof. For instance, harmonization node 106 may use a parser module and Diameter protocol definitions to identify characteristics (e.g., particular AVP information) of a received message that indicate an associated Diameter protocol.

In one embodiment, harmonization node 106 may determine a Diameter protocol associated with a destination (e.g., a node, a host, a realm, a domain, a network segment, or a network) to which a received Diameter message is addressed or may traverse. For example, harmonization node 106 may determine, by examining a header portion of a Diameter message, that the Diameter message is addressed to Node B 104. Using one or more methods, harmonization node 106 may determine that Node B 104 utilizes a particular Diameter protocol. In another example, harmonization node 106 may determine, by examining one or more portions of a received Diameter message, an intermediate (e.g., a next hop) destination to send the received Diameter message, or Diameter information therein. In this example, harmonization node 106 may determine that the intermediate destination utilizes a particular Diameter protocol.

In one embodiment, harmonization node 106 may determine that Diameter protocol harmonization should be performed. For example, after receiving a Diameter message destined for Node B 104, harmonization node 106 may determine that the Diameter protocol associated with the received Diameter message is incompatible with the Diameter protocol associated with the message's destination, Node B 104.

In response to determining that Diameter protocol harmonization should be performed, harmonization node 106 may perform Diameter protocol harmonization. In one embodiment, Diameter protocol harmonization may include modifying a received Diameter message so as to make the Diameter message compatible with a Diameter protocol used by a destination. For example, a header portion of a received Diameter message sent from Node A 102 may be modified at harmonization node 106 so it is compatible for processing at Node B 104. After modification, the modified Diameter message may be sent to the destination.

In another embodiment, Diameter protocol harmonization may include generating a new Diameter message that is based on the received Diameter message. For example, harmonization module 108 may use a harmonization rule to modify or convert Diameter information from a received Diameter message to be compatible with a Diameter protocol used by a destination and may include the modified Diameter information in the new Diameter message. After generating a Diameter message that is based on the received Diameter message, the generated Diameter message may be sent to the destination and the received Diameter message may be discarded.

It will be appreciated that Diameter protocol harmonization may be depend on various factors, e.g., Diameter protocols involved and Diameter information to be communicated. For example, harmonizing a Diameter message originating from Node A 102 and destined for Node B 104 may include a set of harmonization rules and/or processing steps. Likewise, harmonizing a Diameter message originating from Node B 104 and destined for Node A 102 may include a different set of harmonization rules and/or processing steps.

FIG. 2 is a diagram illustrating exemplary information usable for determining a Diameter protocol according to an embodiment of the subject matter described herein. In one embodiment, the exemplary information may be stored at a database, e.g., rules database 110, and/or other data structure. For example, the exemplary information may be located at or integrated with one or more Diameter nodes, e.g., harmonization node 106, Node A 102, and Node B 104. In another example, one or more Diameter nodes may have access to the exemplary information stored at a distinct database node.

Referring to FIG. 2, a table 200 represents any suitable data structure for storing information usable for determining a Diameter protocol associated with Diameter information and/or a destination for Diameter information. In the embodiment illustrated in FIG. 2, table 200 may include Diameter host identifiers (IDs), application IDs, and associated Diameter protocol IDs. Diameter host IDs may be uniform resource identifiers (URIs) or other identifiers for identifying Diameter nodes. For instance, a Diameter host ID may indicate an origination node for a Diameter message received at a harmonization node 106. A Diameter host ID may also be usable to identify a vendor and/or network associated with the origination node.

Application IDs may be values or other information for identifying applications that use a Diameter protocol. For example, an application ID may identify an authentication application, an authorization application, an accounting application, or a vendor specific application. As shown in the embodiment illustrated in FIG. 2, a Diameter host ID may be associated with various application IDs.

Diameter protocol IDs may be values or other information for identifying particular Diameter protocols or groups of Diameter protocols. For example, a Diameter protocol ID may be a version number, a variant number, a value based on a global identifying scheme, or a value based on a local (e.g., vendor specified) identifying scheme. In another example, a Diameter protocol ID may indicate all Diameter protocols that are compatible with a vendor, a product, or a product version. For example, a Diameter protocol ID "1" may indicate a Tekelec-compatible Diameter protocol, a Diameter protocol ID "2" may indicate a Cisco-compatible Diameter protocol, and a Diameter protocol ID "3" may indicate an Ericsson-compatible Diameter protocol.

In one embodiment, a Diameter host ID and an application ID may be associated with a Diameter protocol IDs. For example, as illustrated in table 200, a Diameter host ID "www.tekelec.com" and an application ID "88" may be associated with a Diameter protocol ID "1". In another example illustrated in table 200, a Diameter host ID "www.vzw.com" and an application ID "88" may be associated with a Diameter protocol ID "2". In yet another example illustrated in table 200, a Diameter host ID "www.vzw.com" and an application ID "15" may be associated with a Diameter protocol ID "3".

In one embodiment, harmonization node 106 and/or harmonization module 108 may use table 200, or information therein, for determining Diameter protocols. For example, harmonization node 106 may examine a header portion of a received Diameter message and discover an origination host ID and an application ID. Using the origination host ID and the application ID, harmonization node 106 may query data structure 200 for a Diameter protocol ID associated with the origination node. In another example, harmonization node 106 may examine a header portion of a received Diameter message and discover a destination host ID and an application ID. Using the destination host ID and the application ID, harmonization node 106 may query data structure 200 for a Diameter protocol ID associated with a destination.

FIG. 3 is a diagram illustrating exemplary information for determining a harmonization rule set to be applied according to an embodiment of the subject matter described herein. As used herein, a harmonization rule set may include one or more harmonization rules. In one embodiment, the exemplary information may be stored at a database, e.g., rules database 110, and/or other data structure. For example, the exemplary information may be located at or integrated with one or more Diameter nodes, e.g., harmonization node 106, Node A 102, and Node B 104. In another example, one or more Diameter nodes may have access to the exemplary information stored at a distinct database node.

Referring to FIG. 3, a table 300 represents any suitable data structure for storing information usable for determining a harmonization rule set to be applied in harmonizing Diameter information. In the embodiment illustrated in FIG. 3, table 300 may include ingress Diameter protocols ID, egress Diameter protocols ID, and associated harmonization rule set IDs. Ingress Diameter protocol IDs may identify Diameter protocols associated with ingress Diameter information. For instance, an ingress Diameter protocol ID may identify a Diameter protocol that is utilized by an origination node of a received Diameter message. Egress Diameter protocol IDs may identify Diameter protocols associated with egress Diameter information. For instance, an egress Diameter protocol ID may identify a Diameter protocol utilized by a destination node that is to receive Diameter information. Harmonization rule set IDs may be values or other information for identifying harmonization rule sets.

In one embodiment, an ingress Diameter protocol ID and an egress Diameter protocol ID may be associated with a harmonization rule set ID. For example, as illustrated in table 300, an ingress Diameter protocol ID "1" and an egress Diameter protocol ID "2" may be associated with a harmonization rule set ID "1". In another example illustrated in table 300, an ingress Diameter protocol ID "2" and an egress Diameter protocol ID "1" may be associated with a harmonization rule set ID "2". In yet another example illustrated in table 300, an ingress Diameter protocol ID "1" and an egress Diameter protocol ID "3" may be associated with a harmonization rule set ID "3".

In one embodiment, harmonization node 106 and/or harmonization module 108 may use table 300, or information therein, for determining harmonization rule sets to apply during Diameter protocol harmonization. For example, using an ingress Diameter protocol ID and an egress Diameter protocol ID, harmonization node 106 may query table 300 for an appropriate harmonization rule set ID. In one embodiment, an appropriate harmonization rule set ID may indicate a particular harmonization rule set for harmonizing Diameter information associated with the ingress Diameter protocol such that the harmonized Diameter information is compatible with the egress Diameter protocol. For example, a harmonization rule set may indicate multiple rules or processing steps for converting and/or generating a Diameter message, or portion therein, from an ingress Diameter protocol to an egress Diameter protocol.

FIG. 4 is a diagram illustrating exemplary information for determining rules associated with a harmonization rule set according to an embodiment of the subject matter described herein. In one embodiment, the exemplary information may be stored at a database, e.g., rules database 110, and/or other data structure. For example, the exemplary information may be located at or integrated with one or more Diameter nodes, e.g., harmonization node 106, Node A 102, and Node B 104. In another example, one or more Diameter nodes may have access to the exemplary information stored at a distinct database node.

Referring to FIG. 4, a table 400 represents any suitable data structure for storing information usable for determining rules associated with a harmonization rule set. In the embodiment illustrated in FIG. 4, table 400 may include harmonization rule set IDs and associated harmonization rules. As stated above, harmonization rule set IDs may be values or other information for identifying harmonization rule sets. Harmonization rules may include instructions, processing steps, and/or other information for modifying and/or generating Diameter information. For example, a harmonization rule may indicate a particular portion or portions of a Diameter message to modify and particular modifications to perform. In another example, a harmonization rule may indicate particular information (e.g., a vendor specific AVP) to add to a Diameter message. In yet another example, a harmonization rule may indicate particular information to delete in a Diameter message.

In one embodiment, a harmonization rule set ID may be associated with one or more harmonization rules. For example, as illustrated in table 400, harmonization rule set ID "1" may be associated with three harmonization rules, e.g., 'ADD AVP: "Server Capacity" AVP: Default value="300"', 'MODIFY AVP: Format AVP Containing IMSI Value into ITU E.212 Format", and 'DELETE AVP: Delete "ATT_Host" AVP'. As illustrated in table 400, each rule may include a different action or processing step to be performed. In one embodiment, a harmonization rule set may include priority and/or ordering information. For example, a harmonization rule set may include information indicating in what order associated harmonization rules are to be applied.

In one embodiment, harmonization node 106 and/or harmonization module 108 may use table 400, or information therein, for determining rules associated with a harmonization rule set. For example, harmonization node 106 may determine a harmonization rule set ID based on an ingress Diameter protocol ID and an egress Diameter protocol ID. Using the harmonization rule set ID, harmonization node 106 may query data structure 400 for each harmonization rule. In one embodiment, harmonization node 106 and/or harmonization module 108 may apply the associated harmonization rules during Diameter protocol harmonization. After applying the harmonization rules, Diameter information may be harmonized such that the Diameter information is compatible for processing at a destination node.

Figure 5:
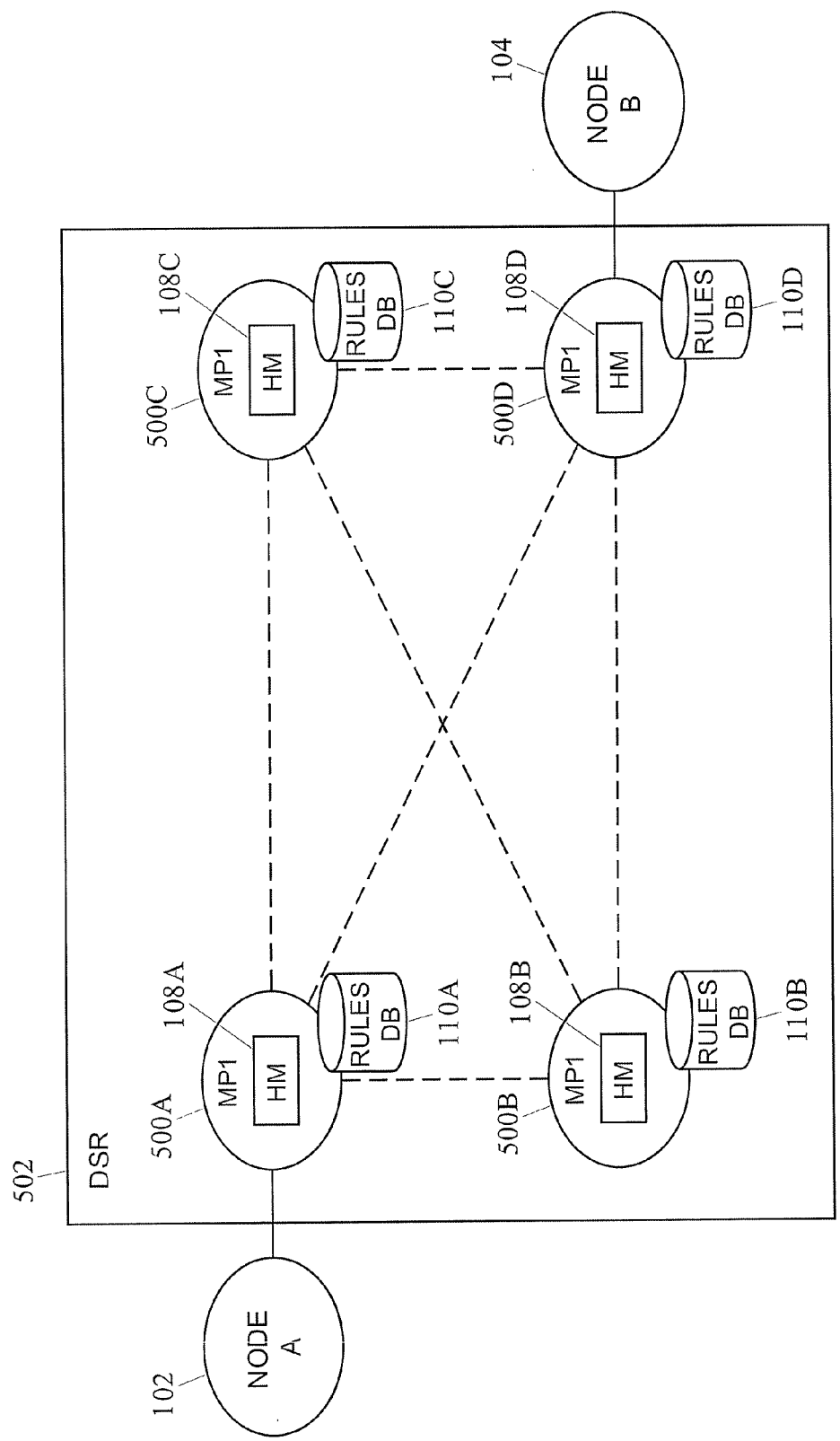
FIG. 5 is block diagram illustrating an exemplary Diameter signaling router for providing Diameter protocol harmonization according to an embodiment of the subject matter described herein.

FIG. 5 is block diagram illustrating an exemplary DSR 102 for providing Diameter protocol harmonization according to an embodiment of the subject matter described herein.

Referring to the embodiment illustrated in FIG. 5, DSR 102 includes one or more message processors (MPs) 500A-D for sending, receiving, and/or processing various messages, such as Diameter messages. MPs 500A-D may include one or more communications interfaces for communicating signaling messages (e.g., Diameter messages) and/or inter-MP messages. For example, MPs 500A-D may send and receive Diameter request messages between external entities, e.g., Node A 102 and Node B 104. MPs 500A-D may also send and receive messages (e.g., Diameter messages and other non-Diameter messages) between internal entities. For example, MP 500A may screen a Diameter message and relay it to MP 500C for further processing.

MPs 500A-D may include or have access to one or more harmonization modules, e.g., harmonization modules 108A-D. Harmonization modules 108A-D may include any functionality described herein associated with Diameter protocol harmonization. In one embodiment, MPs 500A-D and harmonization modules 108A-D may include functionality for handling particular messages. For example, harmonization module 108A at MP 500A may handle communications with Node A 102 and harmonization module 108D at MP 500D may handle communications with Node B 104.

MPs 500A-D and/or harmonization modules 108A-D may include or have access to one or more databases, such as rules databases 110A-D and a reporting database. Rules databases 110A-D may include any suitable data structure for storing or maintaining harmonization rules. In one embodiment, rules databases 110A-D may include functionality for handling particular messages and/or Diameter protocols. For example, rules database 110A may include with rules for converting a Diameter protocol associated with a particular service provider or a particular equipment vendor and rules database 110B may include with rules for converting Diameter credit control messages.

In one embodiment where a DSR 102 includes multiple processors (e.g., a distributed architecture), each processor (e.g., an MP 500) may be capable of providing Diameter protocol harmonization, or a portion thereof, e.g., regardless of which processor receives a Diameter message. For example, MP 500A may receive a Diameter request message from Node A 102 that is destined for Node B 104. MP 500A and/or harmonization module 108A may harmonize the received Diameter message to a Diameter protocol compatible for processing at Node B 104. MP 500A may relay or route the harmonized Diameter message to another entity, e.g., to Node B 104 or to MP 500D for delivery to Node B 104.

In some embodiments, two or more MPs 500 may work together to harmonize a Diameter message. For example, MP 500B may receive a Diameter request message from Node A 102 that is destined for Node B 104. MP 500B and/or harmonization module 108B may partially harmonize the received Diameter message to a Diameter protocol or other format compatible for further processing at MP 500C. MP 500A may send the partially harmonized Diameter message to MP 500C. MP 500C may receive the partially harmonized Diameter message. MP 500C and/or harmonization module 108C may further harmonize the received Diameter message to a Diameter protocol compatible for processing at Node B 104. MP 500A may relay or route the harmonized Diameter message to Node B 104.

Figure 6:
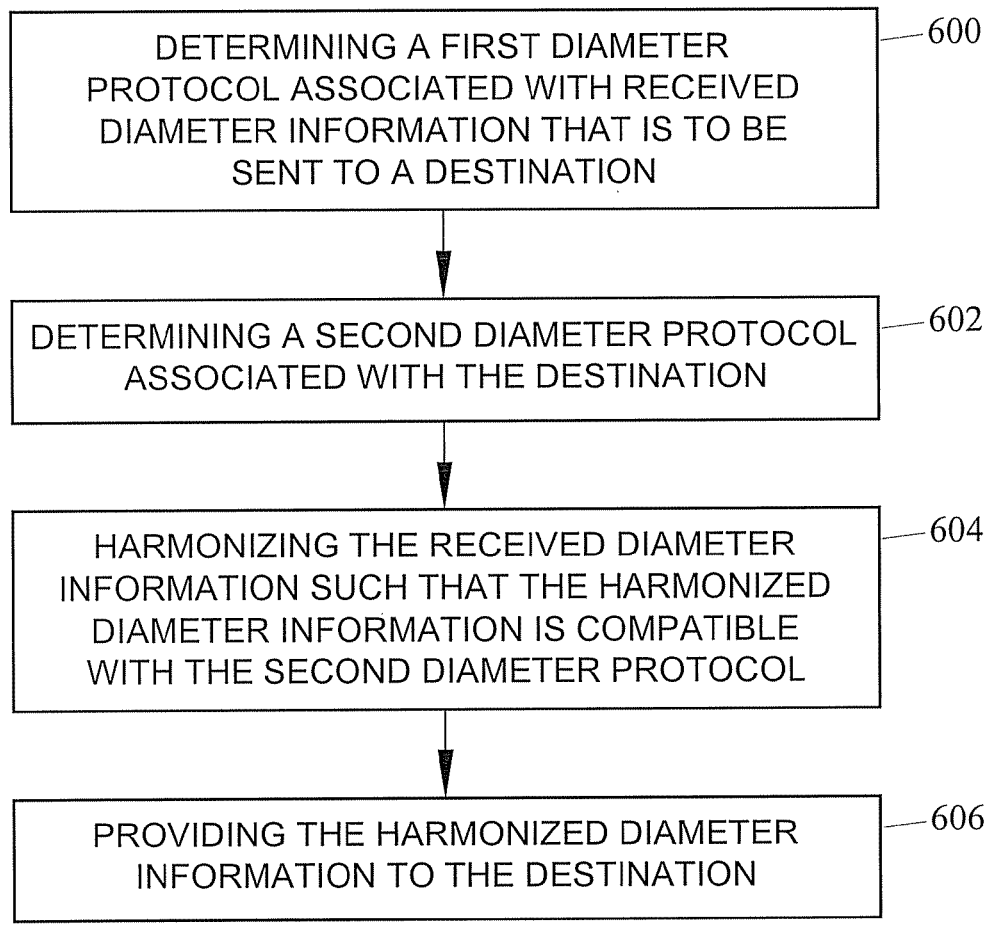
FIG. 6 is a flow chart illustrating exemplary steps for providing Diameter protocol harmonization according to an embodiment of the subject matter described herein.

FIG. 6 is a flow chart illustrating exemplary steps for providing Diameter protocol harmonization according to an embodiment of the subject matter described herein. In one embodiment, one or more exemplary steps described herein may be performed at or performed by harmonization node 106, e.g., a DSR or a processor (e.g., an MP) in a DSR. In another embodiment, one or more exemplary steps described herein may be performed at or performed by harmonization module 108 located at various Diameter nodes, e.g., Node A 102 and Node B 104.

Referring to the embodiment illustrated in FIG. 6, at step 600, a first Diameter protocol may be determined that is associated with received Diameter information. The received Diameter information may be for sending to a destination. For example, harmonization node 106 (e.g., a DSR) may receive a Diameter signaling message from Node A 102. The received message may be intended for Node B 104. Harmonization node 106 may use the message and other accessible information (e.g., table 200 in rules database 110) in determining that the received Diameter message uses a particular Diameter protocol (e.g., a Diameter Variant 1).

At step 602, a second Diameter protocol may be determined that is associated with the destination. Continuing from the example stated above, harmonization node 106 may determine a Diameter protocol that is associated with Node B 104.

In one embodiment, the first Diameter protocol and the second Diameter protocol may each include a Diameter protocol implementation, a Diameter protocol version, a variant of a Diameter protocol version, a Diameter protocol variant, a version of a Diameter protocol variant, a Diameter protocol defined by a standards entity, or a Diameter protocol defined by a non-standards entity.

At step 604, the received Diameter information may be harmonized such that the harmonized Diameter information is compatible with the second Diameter protocol. Continuing from the example stated above, harmonization node 106 may use harmonization rules to harmonize the received Diameter message from its original Diameter protocol to the Diameter protocol used by Node B 104.

In one embodiment, harmonizing the Diameter information may include adding, deleting, and/or modifying the received Diameter information, or a portion thereof. In another embodiment, harmonizing the Diameter information may include generating a new Diameter message based on the received Diameter information. For example, the received Diameter information and/or the harmonized Diameter information may include a Diameter message, AVP information, parameter information, value information, message header information, or message payload information.

At step 606, the harmonized Diameter information may be provided to the destination. For example where harmonizing the received Diameter information include generating a Diameter message, providing the harmonized Diameter information to the destination may include sending the generated Diameter message to the destination. In another example where harmonizing the received Diameter information include modifying a received Diameter message, providing the harmonized Diameter information to the destination may include sending the modified Diameter message to the destination.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing Diameter protocol harmonization, the method comprising:

at a Diameter node:
determining a first Diameter protocol associated with received Diameter
determining a second Diameter protocol associated with the destination, wherein the second Diameter protocol is different than the first Diameter protocol, wherein determining the second Diameter protocol includes determining the second protocol based on an application identifier and an origination host ID associated with the received Diameter information;
harmonizing the received Diameter information such that the harmonized Diameter information is compatible with the second Diameter protocol, wherein harmonizing includes adding, deleting, or modifying an attribute value pair associated with the received Diameter information; and
providing the harmonized Diameter information to the destination.

2. The method of claim 1 wherein the first Diameter protocol and the second Diameter protocol each include a Diameter protocol implementation, a Diameter protocol version, a variant of a Diameter protocol version, a Diameter protocol variant, a version of a Diameter protocol variant, a Diameter protocol defined by a standards entity, or a Diameter protocol defined by a non-standards entity.

3. The method of claim 1 wherein the destination includes a node, a host, a realm, a domain, a network segment, or a network.

4. The method of claim 1 wherein harmonizing the Diameter information includes generating, using a harmonization rule, a new Diameter message based on the received Diameter information and wherein providing the harmonized Diameter information to the destination includes sending the new Diameter message to the destination.

5. The method of claim 1 wherein harmonizing the Diameter information includes modifying, using a harmonization rule, the received Diameter information and wherein providing the harmonized Diameter information to the destination includes sending the modified Diameter information to the destination.

6. The method of claim 1 wherein one or more harmonization rule is stored at a database.

7. The method of claim 1 wherein at least one of the received Diameter information and the harmonized Diameter information includes a Diameter message, attribute value pair (AVP) information, parameter information, value information, message header information, or message payload information.

8. The method of claim 1 wherein the Diameter node comprises a Diameter signaling router (DSR), a Diameter relay agent, a Diameter redirect agent, a Diameter translation agent, a Diameter proxy agent, a Diameter node, a mobility management entity (MME), a home subscriber server (HSS) and/or authentication, authorization, and accounting (AAA) server, a Bearer Binding and Event Reporting Function (BBERF), a serving gateway (SGW), a packet data network gateway (PDN GW), a policy and charging enforcement function (PCEF), a policy and charging rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a node, a processor, a database, or a computing platform.

9. A system for providing Diameter protocol harmonization, the system comprising:
a Diameter node including:
a communications interface for receiving Diameter information that is to be sent to a destination; and
a harmonization module for determining a first Diameter protocol associated with the received Diameter information, for determining a second Diameter protocol associated with the destination, wherein the second Diameter protocol is different than the first Diameter protocol, wherein determining the second Diameter protocol includes determining the second protocol based on an application identifier and an origination host ID associated with the received Diameter information, for harmonizing the received Diameter information such that the harmonized Diameter information is compatible with the second Diameter protocol, wherein harmonizing includes adding, deleting, or modifying an attribute value pair associated with the received Diameter information, and for providing the harmonized Diameter information to the destination.

10. The system of claim 9 wherein the first Diameter protocol and the second Diameter protocol each include a Diameter protocol implementation, a Diameter protocol version, a variant of a Diameter protocol version, a Diameter protocol variant, a version of a Diameter protocol variant, a Diameter protocol defined by a standards entity, or a Diameter protocol defined by a non-standards entity.

11. The system of claim 9 wherein the destination includes a node, a host, a realm, a domain, a network segment, or a network.

12. The system of claim 9 wherein harmonizing the received Diameter information includes generating, using a harmonization rule, a new Diameter message based on the received Diameter information and wherein providing the harmonized Diameter information to the destination includes sending the new Diameter message to the destination.

13. The system of claim 9 wherein harmonizing the received Diameter information includes modifying, using a harmonization rule, the received Diameter information and wherein providing the harmonized Diameter information to the destination includes sending the modified Diameter information to the destination.

14. The system of claim 9 comprising a database for storing one or more harmonization rules.

15. The system of claim 9 wherein at least one of the received Diameter information and the harmonized Diameter information includes a Diameter message, attribute value pair (AVP) information, parameter information, value information, message header information, or message payload information.

16. The system of claim 9 wherein the system comprises a Diameter signaling router, a Diameter relay agent, a Diameter redirect agent, a Diameter translation agent, a Diameter proxy agent, a Diameter node, a mobility management entity (MME), a home subscriber server (HSS) and/or authentication, authorization, and accounting (AAA) server, a Bearer Binding and Event Reporting Function (BBERF), a serving gateway (SOW), a packet data network gateway (PDN GW), a policy and charging enforcement function (PCEF), a policy and charging rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a node, a processor, a database, or a computing platform.

17. A non-transitory computer readable medium having stored thereon executable instructions that when executed by the processor of a computer control the computer to perform steps comprising:

at a Diameter node:

determining a first Diameter protocol associated with received Diameter information that is to be sent to a destination;

determining a second Diameter protocol associated with the destination, wherein the second Diameter protocol is different than the first Diameter protocol, wherein determining the second Diameter protocol includes determining the second protocol based on an application identifier and an origination host ID associated with the received Diameter information;

harmonizing the received Diameter information such that the harmonized Diameter information is compatible with the second Diameter protocol, wherein harmonizing includes adding, deleting, or modifying an attribute value pair associated with the received Diameter information; and providing the harmonized Diameter information to the destination.

* * * * *

UNITED STATES PATENT AND TRADEMARK OFFICE
CERTIFICATE OF CORRECTION

| | | |
|---|---|---|
| PATENT NO. | : 8,532,110 B2 | Page 1 of 1 |
| APPLICATION NO. | : 13/026144 | |
| DATED | : September 10, 2013 | |
| INVENTOR(S) | : McCann et al. | |

It is certified that error appears in the above-identified patent and that said Letters Patent is hereby corrected as shown below:

In the Claims

Column 11, line 7, Claim 1
 replace "received Diameter"
 with --received Diameter Information that is to be sent to a destination;--

Signed and Sealed this
Twenty-sixth Day of May, 2015

Michelle K. Lee
*Director of the United States Patent and Trademark Office*